(12) United States Patent
Hall et al.

(10) Patent No.: US 10,003,751 B2
(45) Date of Patent: Jun. 19, 2018

(54) MULTIPLE FIELD OF VIEW DUAL BAND OPTICS WITH INTEGRATED CALIBRATION SOURCE

(71) Applicant: The United States of America, as represented by the Secretary of the Army, Washington, DC (US)

(72) Inventors: John M. Hall, Stafford, VA (US); Richard A. Wright, Alexandria, VA (US); Brian J. Kowalewski, Fredericksburg, VA (US); Andrew J. Dotson, Alexandria, VA (US)

(73) Assignee: THE UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 269 days.

(21) Appl. No.: 15/163,749

(22) Filed: May 25, 2016

(65) Prior Publication Data
US 2017/0347037 A1    Nov. 30, 2017

(51) Int. Cl.
| | |
|---|---|
| G02B 23/12 | (2006.01) |
| H04N 5/232 | (2006.01) |
| H04N 5/33 | (2006.01) |
| G02B 23/16 | (2006.01) |
| G02B 15/14 | (2006.01) |

(52) U.S. Cl.
CPC ......... *H04N 5/23296* (2013.01); *G02B 15/14* (2013.01); *G02B 23/16* (2013.01); *H04N 5/332* (2013.01)

(58) Field of Classification Search
CPC .......................... H04N 5/23296; G02B 13/146
See application file for complete search history.

(56) References Cited

U.S. PATENT DOCUMENTS

| | | | |
|---|---|---|---|
| 4,469,396 A | 9/1984 | Neil | |
| 5,214,532 A | 5/1993 | Hall et al. | |
| 5,479,016 A | 12/1995 | Curry et al. | |
| 6,906,784 B2 * | 6/2005 | Hill ..................... | G01B 9/02019 355/53 |
| 6,987,569 B2 * | 1/2006 | Hill ..................... | G03F 7/70775 356/500 |

(Continued)

OTHER PUBLICATIONS

Handbook of Optics. vol. 2; W.B. Wetherell et al.*

(Continued)

*Primary Examiner* — Luis Perez Fuentes
(74) *Attorney, Agent, or Firm* — Richard J. Kim

(57) ABSTRACT

A multiple field of view dual band optical device with integrated calibration source is disclosed. Such an optical device is modular, and has a rotating electro-mechanical "tumbler" which houses two orthogonal Galilean afocal optical assemblies as well as at least one uniform temperature source. This modular device is intended to be inserted in front of a camera system which already has an imager optical assembly mated to a detector focal plane array. The disclosed modular device thus serves the purpose of providing to an existing dual-band camera imager up to four new optical fields of view as well as an integral calibration source, all of which can be electro-mechanically selected for viewing by a host camera imager.

16 Claims, 5 Drawing Sheets

(56) References Cited

U.S. PATENT DOCUMENTS

| | | | | |
|---|---|---|---|---|
| 7,218,444 B2* | 5/2007 | Cook | ............... | G02B 13/146 |
| | | | | 359/353 |
| 7,528,962 B2* | 5/2009 | Hill | ............... | G03F 7/70775 |
| | | | | 356/496 |
| 9,225,914 B2 | 12/2015 | Kingdon et al. | | |
| 2006/0061771 A1* | 3/2006 | Hill | ............... | G03F 7/70516 |
| | | | | 356/510 |
| 2017/0347037 A1* | 11/2017 | Hall | ............... | H04N 5/23296 |

OTHER PUBLICATIONS

Handbook of Optics. vol. 2; W. B. Wetherell.*
Google search for NPL.*
Sclater, Neil (2011), "Cam, Geneva, and Ratchet Drives and Mechanisms,"Mechanisms and Mechanical Devices Sourcebook (5h ed.), New York: McGraw Hill, pp. 180-207, ISBN 978-0-07170442-7.

* cited by examiner

MULTIPLE FIELD OF VIEW DUAL BAND OPTICS WITH INTEGRATED CALIBRATION SOURCE

GOVERNMENT INTEREST

The invention described herein may be manufactured, used, sold, imported, and/or licensed by or for the Government of the United States of America.

FIELD OF THE INVENTION

This invention is applicable to the field of optical devices, particularly in regards to multiple field of view dual band optics.

BACKGROUND OF THE INVENTION

The newest generation of high performance infrared imaging sensor systems employ staring focal plane detector arrays which are sensitive in both the 3-5 micron "mid-wave infrared" and 8-12 micron "long-wave infrared" spectral bands. This "dual band" operation places a great burden on refractive lens designs to maintain color aberration correction over both bands simultaneously. When the sensor is also required to provide three or four fields of view, optical complexity increases even further. Design approaches for new dual-band systems can no longer be derived from older generation single-band sensors. For example, U.S. Pat. No. 5,479,016 "Compact Second Generation FLIR Kit" (1995) describes optical systems which typify the sensor architecture for single-band high performance sensors. In general, this approach involves a re-imaging afocal assembly which projects a real pupil onto a mirror element, which in turn sends the light into a re-imager assembly which contains an intermediate focal plane and then an aperture stop located near the final focal plane. The afocal assembly includes a set of lenses which "flip in" when a wider field of view is desired, and thus the whole system is capable of providing only two fields of view in total. Furthermore, when the system is evaluated for performance in both 3-5 and 8-12 micron spectral bands, it is quickly seen that the chromatic aberrations between the two bands are very disparate and thus the basic design form can not be simply "tweaked" to achieve good performance. A survey of the current art reveals that imaging optics for dual-band systems have been developed, such as per U.S. Pat. No. 7,218,444 B2 "Dual Band, Dual Focal-Length Relayed Refractive Imager" (2007). However, these optical assemblies do not offer wide selection of field of view change options, which in fact are referenced as "optional fore-optics" in the aforementioned patent. Furthermore, the total optical system must also somehow provide high quality optical imaging of one or more thermal reference objects which are used to calibrate the detector focal plane array. This function, too, is complicated by the need for multiple field of view switching and simultaneous operation in two disparate spectral bands. In the prior art such as U.S. Pat. No. 7,218,444 B2, a typical approach to include a calibration source would involve adding a motorized flip-in mirror along with an extra set of imaging lenses adjacent to the primary optical path in order to periodically view a calibration target.

SUMMARY OF THE INVENTION

A solution is addressed to provide diffraction-limited optical image quality with up to four fields of view and with operation in both spectral bands simultaneously. Further, a simple means of periodically injecting a calibration target that does not require extra mechanisms or optical elements is disclosed as an integral part of the solution.

In one aspect, an exemplary dual-band camera imager is disclosed, comprising a camera system having an imager optical assembly mated to a detector focal plane array and a multiple field of view dual band optical device with integrated calibration source modularly arranged with said imager optical assembly of said camera system. Said modular arrangement provides a dual-band camera imaging capability for up to four selectable optical fields of view, as well as an integral calibration source.

In another aspect, an exemplary multiple field of view dual band optical device with integrated calibration source is disclosed. Such an exemplary multiple field of view dual band optical device comprises a base unit housing providing support for pivot bearings; a tumbler having a tumbler housing capable of rotating about said pivot bearings continuously over 360 degrees; a gear drive assembly based on a Geneva gear mechanism to provide accurate and quick positioning of said rotatable tumbler housing; a first Galilean afocal optical assembly housed within said tumbler to axially rotate about said pivot bearings; a second Galilean afocal optical assembly housed radially orthogonal from said first Galilean afocal optical assembly within said tumbler to axially rotate about said pivot bearings, said first and second Galilean afocal optical assemblies forming an axially rotatable crossed Galilean afocal optical system; and a flat thermal reference surface housed at an intermediate radial position between said first and second Galilean afocal optical assemblies. Said thermal reference surface being housed in said tumbler enables a host system to perform an automatic calibration routine for rapid calibration of said host system's detector array.

Yet, in another aspect, an exemplary method for multiple field of view dual band optical imaging is disclosed. Such an exemplary method comprises the steps of arranging a multiple field of view dual band optical device with integrated calibration source in optical alignment with an imaging assembly of a host system; and aligning by rotation one optical end of an electro-mechanical tumbler of said multiple field of view dual band optical device with integrated calibration source to an optical axis of said imaging assembly. When the electro-mechanical tumbler is moved to a 45 degree angle, a reference surface is positioned normal to the optical axis of the host system for use as a calibration source. When the electro-mechanical tumbler is rotated such that a first optical end of a first Galilean afocal optical assembly housed within said electro-mechanical tumbler is positioned normal to the optical axis of the host system such that light from a scene first enters the first optical end, then light from a scene passing through said first Galilean afocal optical assembly is reduced in diameter but magnified in angle to produce a positive magnification of the first Galilean afocal optical assembly. When the electro-mechanical tumbler is rotated such that an opposing optical end of said first Galilean afocal optical assembly housed within said electro-mechanical tumbler is positioned normal to the optical axis of the host system such that light from a scene first enters the opposing optical end, then light from a scene passing through said first Galilean afocal optical assembly is enlarged but its divergent angle is reduced to produce a negative magnification, which is the inverse power of the positive magnification of the first Galilean afocal optical assembly. When the electro-mechanical tumbler is rotated such that a first optical end of a second Galilean afocal optical assembly housed within said electro-mechanical tumbler is positioned normal to the optical axis of the host system such that light from a scene first enters the first optical end, then light from a scene passing through said second Galilean afocal optical assembly is reduced in diameter but magnified in angle to produce a positive magnification of the second Galilean afocal optical assembly, which is different from the positive magnification of the first Galilean afocal optical assembly. Finally, when the electro-mechanical tumbler is rotated such that an opposing optical end of said second Galilean afocal optical assembly housed within said electro-mechanical tumbler is positioned normal to the optical axis of the host system such that light from a scene first enters the opposing optical end, then light from a scene passing through said second Galilean afocal optical assembly is enlarged but its divergent angle is reduced to produce a negative magnification, which is the inverse power of the positive magnification of the second Galilean afocal optical assembly.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

A multiple field of view dual band optical device with integrated calibration source is disclosed. Such an optical device is modular, and has a rotating electro-mechanical "tumbler" which houses two orthogonal Galilean afocal optical assemblies, as well as at least one uniform temperature source. This modular device is intended to be inserted in front of a camera system which already has an imager optical assembly mated to a detector focal plane array. The disclosed modular device thus serves the purpose of providing to an existing dual-band camera imager up to four new optical fields of view, as well as an integral calibration source, all of which can be electro-mechanically selected for viewing by a host camera imager.

Figure 1:
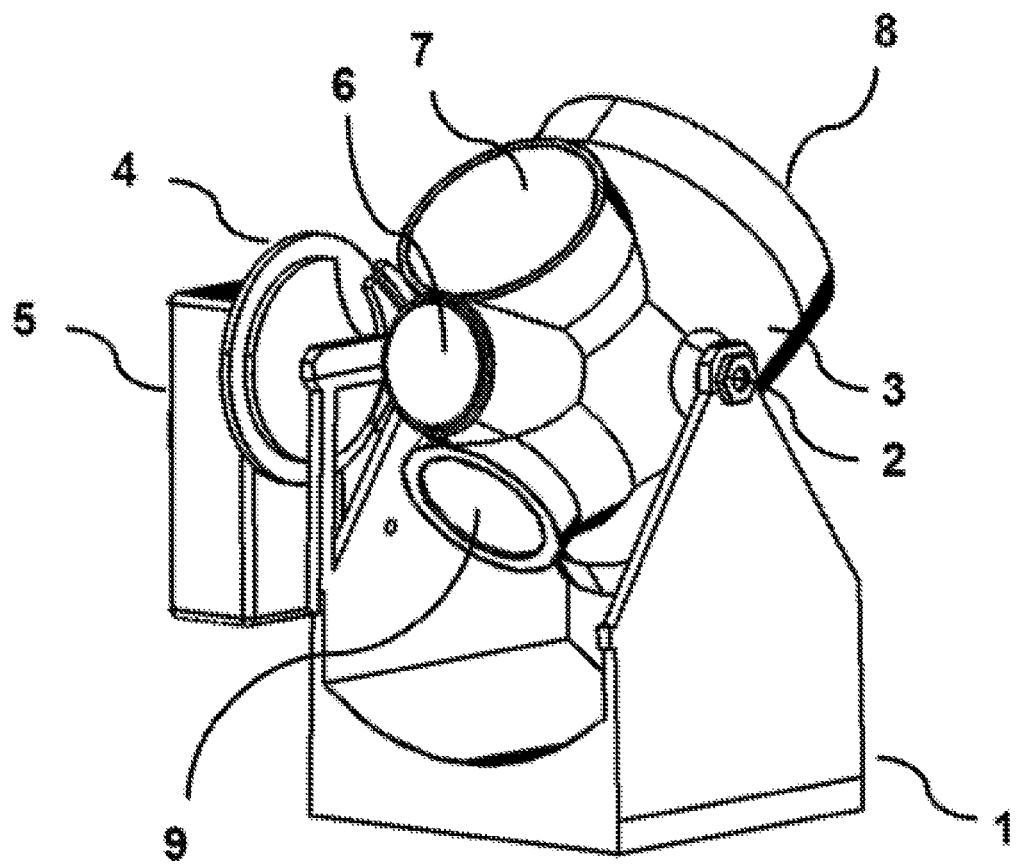
FIG. 1 shows a side profile view of an exemplary multiple field of view dual band optical device with integrated calibration source.

FIG. 1 shows a side profile view of an exemplary multiple field of view dual band optical device with integrated calibration source. The base unit housing 1 provides support for the pivot bearings 2 which in turn allows the tumbler mechanism 3 to rotate continuously over 360 degrees. A gear drive such as the Geneva mechanism 4 provides accurate and quick positioning, and may be actuated manually or preferably by attaching a rotary electric motor 5 which allows remote operation. A flat thermal reference surface 6 is provided at an intermediate position between orthogonal optical axis defined by the lens elements located at 7, 8, and 9. The thermal reference can be simple or complex according to desire, so long as it performs the critical function of providing a uniform temperature radiation within the optical footprint of the beam of light which reaches the detector. The simplest version would be a copper plate painted with a uniform black coating such as commercial Krylon Black paint. More complex devices could also be used, such as the thermo-electrically stabilized assemblies commercially available from companies such as II-VI Marlow Industries, Dallas, Tex., which can be adjusted to temperatures other than the ambient. In either case, the reference surface can then be used to calibrate the camera's detector array as is common in the art. The fact that the reference surface is part of the motor controlled rotating tumbler further enables any host system to perform an automatic calibration routine, where all the calibration steps can be automated via software and electronic commands thereby achieving calibration in a minimal amount of time.

Figure 2:
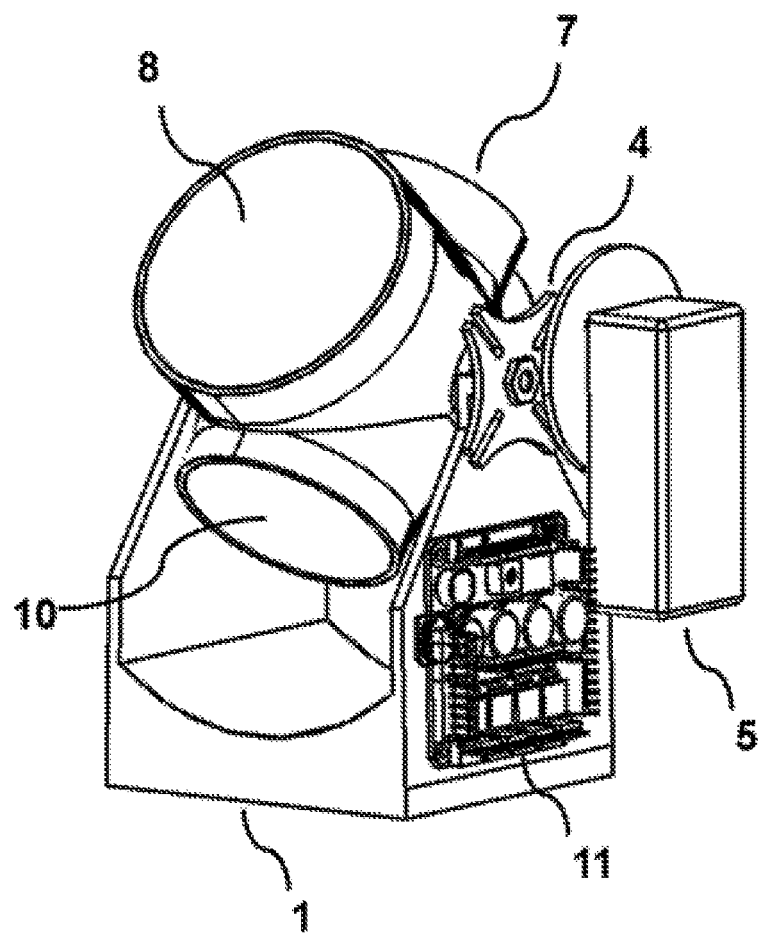
FIG. 2 shows an opposing side profile view of the exemplary multiple field of view dual band optical device with integrated calibration source.

FIG. 2 shows an opposing side profile view of the exemplary multiple field of view dual band optical device with integrated calibration source. The opposing side profile view reveals the reverse view of the Geneva gear mechanism 4, the Geneva Drive motor assembly 5, the last remaining outer lens 10, and a circuit card 11 containing the electronic components to power and control the motor 5. The Geneva drive, also sometimes referred to as a "Maltese Cross" drive, is commonly known in the art and has the properties of providing very accurate and stable positioning at a series of discrete steps when driven by an otherwise simple rotary motion motor 5 such as the "Preci-Step" series from Faulhaber/Micro-Mo, Clearwater, Fla. In this invention, the Geneva drive gears 4 provide four basic rotational step positions at 90 degree angles to each other as well as one intermediate step at 45 degrees for the thermal reference surface 6. An example of a controller circuit card 11 suitable for this purpose is the commercially available EZ-Axis 4 port controller from All Motion Inc., Union City, Calif. The circuit controller accepts input power from a DC source and provides a serial USB computer interface for receiving commands and sending status information as is common in the art. Electronic position feedback of the rotary mechanism can be achieved by a variety of ways as commonly known in the art, to include optical flags, rotary encoders, or Hall Effect sensors.

Figure 3:
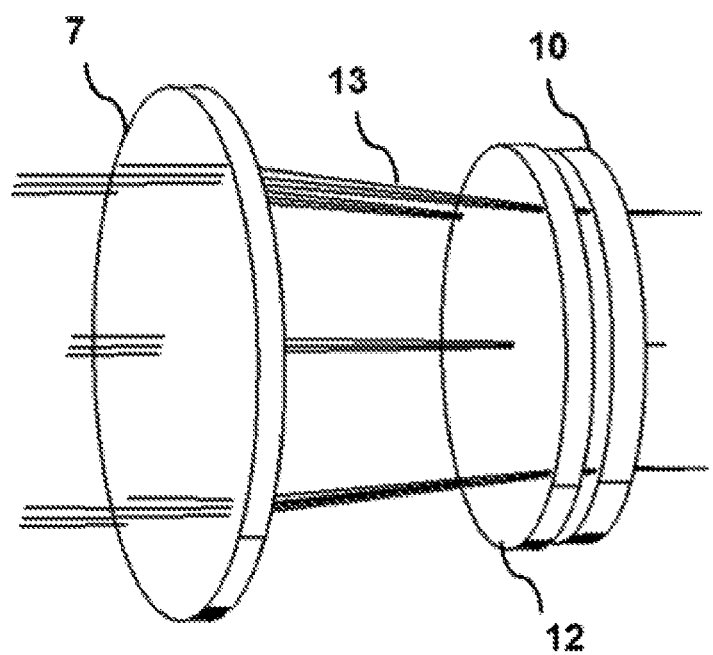
FIG. 3 shows a first exemplary Galilean afocal optical assembly of a crossed Galilean afocal optical system.

FIG. 3 shows details of a first exemplary Galilean afocal optical assembly of a crossed Galilean afocal optical system. In the example shown, the magnification power is either 1.3× or 0.77× depending on rotation relative to the imaging camera, and it is understood that the magnifying power can be altered as needed. Collimated light enters through either the large element 7 or the small outer element 10 depending on which rotation angle is driven by the motor 5. Lens 12 accompanies lens 10 for the purpose of correcting color and other aberrations. The path of light rays 13 indicates the characteristic of Galilean afocals, in which there is no internal focal plane formed and the output light is collimated with a magnification change as described in the prior art per U.S. Pat. No. 5,214,532, incorporated herein by reference, and many other public sources. In this invention, a critical improvement over the prior art is that the lens materials are such that simultaneous optical correction over both 3-5 and 8-12 micron spectral bands is obtained by using combinations of lens materials with different indices of refraction and partial dispersion, including crystalline materials such as Germanium (Ge), Zinc Sulphide (ZnS), Zinc Selenide (ZnSe), Gallium Arsenide (GaAs), which are all available from sources such as II-VI Corporation, Saxonburg, Pa., as well as an amorphous glass material AMTIR-1 which is available from Amorphous Materials Inc, Garland, Tex. Lenses are made from these materials by means of either conventional optical polishing or single-point diamond turning on a highly accurate lathe machine tool as is common in the art. In the embodiment provided, the large positive lens 7 is made of AMTIR-1 and has a power of 0.00287 diopters. The rear lens group consists of a ZnS lens 12 with −0.000186 diopters and a GaAs lens 10 with −0.00351 diopters power. When light from the scene first enters the largest diameter lens 7, then the output beam after passing through lens 10 is reduced in diameter but magnified in angle. This is positive magnification. When the afocal is rotated 180 degrees, light from the scene enters lens 10 and the beam is enlarged as it passes through lens 7 but its divergent angle is reduced. This is negative magnification, which is the inverse power of the positive magnification. The effect is equivalent to looking through a binocular on the objective side.

Figure 4:
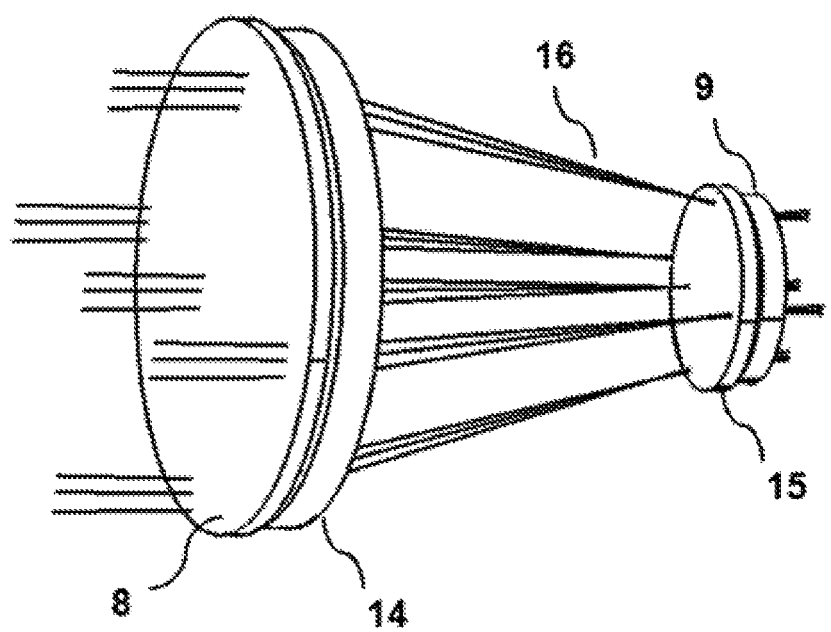
FIG. 4 shows details of a second exemplary Galilean afocal optical assembly of the crossed Galilean afocal optical system which has a stronger magnifying power than the one shown in FIG. 3.

FIG. 4 shows details of a second exemplary Galilean afocal optical assembly of the crossed Galilean afocal optical system which has stronger magnifying power than the one shown in FIG. 3. In the example shown, the magnification power is either 2.8× or 0.35× depending on rotation relative to the imaging camera, and it is understood that the magnifying power can be altered as needed. It is necessary that the two afocals possess different magnification powers in order to provide four distinct fields of view. The path of light rays 16 indicates the characteristic of Galilean afocals, which is that there is no internal focal plane formed and the output light is collimated with a magnification change as described in the prior art per U.S. Pat. No. 5,214,532, incorporated herein by reference, and many other public sources. In this invention, a critical improvement over the prior art is that the lens materials are such that simultaneous optical correction over both 3-5 and 8-12 micron spectral bands is obtained by using combinations of lens materials with different indices of refraction and partial dispersion, including crystalline materials such as Germanium (Ge), Zinc Sulphide (ZnS), Zinc Selenide (ZnSe), Gallium Arsenide (GaAs), as well as an amorphous glass material AMTIR-1 which is available from Amorphous Materials Inc, Garland, Tex. Light enters through either the large element 8 or the small outer element 9 depending on which rotation angle is driven by the motor 5. Lens 14 accompanies lens 8, and lens 15 accompanies lens 9 for the purpose of correcting color and other aberrations. In the embodiment shown, the two large diameter lenses 8 and 14 are AMTIR-1 with power 0.0103 diopters and ZnS with −0.00295 diopters power, respectively. The rear lens group 15 and 9 is ZnSe with 0.007935 diopters power and Germanium with −0.0319 diopters power, respectively. When light from the scene first enters the largest diameter lens 8, then the output beam after passing through lens 9 is reduced in diameter but magnified in angle. This is positive magnification. When the afocal is rotated 180 degrees, light from the scene enters lens 9 and the beam is enlarged as it passes through lens 8 but its divergent angle is reduced. This is negative magnification, which is the inverse power of the positive magnification. The effect is equivalent to looking through a binocular on the objective side.

Figure 5:
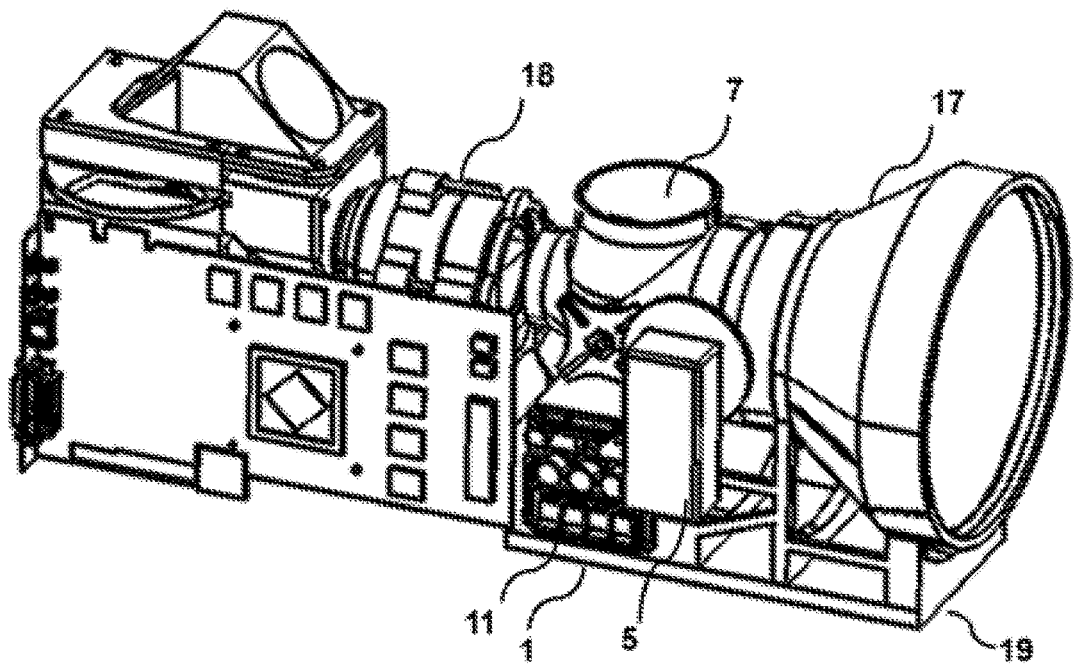
FIG. 5 shows an exemplary multiple field of view dual band optical device with integrated calibration source installed as a module within an otherwise complete notional sensor system.

FIG. 5 shows an exemplary multiple field of view dual band optical device with integrated calibration source installed as a module within an otherwise complete notional sensor system, which is the preferred embodiment for use. An outer metal frame bench 19 holds all the components in relative alignment. By the following disclosure, a method for multiple field of view dual band optical imaging is also disclosed: An exemplary multiple field of view dual band optical device with integrated calibration source, which is clearly identified by components such as its own main housing 1, circuit card 11, drive motor 5, and Galilean afocal lens 7, is positioned between an imaging assembly 18 and an optional external optical afocal magnifier lens assembly 17 which provides further scaling of the total system focal length. The imaging assembly 18 would contain an electronic focal plane array, imaging optics, and control electronics related to the video functions. An example of a commercial unit meeting this general description of 18 is the "Nyx HD-L" integrated camera & lens system offered by American Infrared Solutions, Inc. (AIRS) of Hudson, N.H. The exemplary multiple field of view dual band optical device with integrated calibration source is shown set in line with the optical axes of both 17 and 18 so that optical magnification changes occur with each 90 degree rotation of the invention assembly. The fact that the rotating Galilean afocals have collimated input and output drastically reduces their sensitivity to positional alignment tolerances relative to the host system components. Per the embodiment shown in FIG. 5, the reference surface 6 is positioned normal to the optical axis of the host system when the tumbler is moved to a 45 degree angle. Since the reference surface 6 is already integral to the motor-driven tumbler assembly, no other projection optics or folding flip-in mirrors are required in order for the camera imager to periodically see the reference source. The optional afocal module 17 can be of any form as described in the known prior art including U.S. Pat. No. 5,214,532, et. al., incorporated herein by reference. The full capacity of the invention is best realized when the imaging assembly 18 and external optional afocal 17 are both able to function in the 3-5 micron and 8-12 micron spectral bands simultaneously, but it is understood that the exemplary multiple field of view dual band optical device with integrated calibration source will also function in either single spectral band as well.

It is obvious that many modifications and variations of the present invention are possible in light of the above teachings. It is therefore to be understood that within the scope of the appended claims, the invention may be practiced otherwise than as described.

What is claimed is:

1. A multiple field of view dual band optical device based on a rotating electro-mechanical tumbler which houses two orthogonal Galilean afocal optical assemblies and at least one uniform temperature calibration source modularly arranged with an imager optical assembly of a camera system, comprising:

a host system having an imager optical assembly; and
    said multiple field of view dual band optical device arranged in optical alignment with said imager optical assembly, comprising:
        a base unit housing providing support for pivot bearings,
        a tumbler having a tumbler housing capable of rotating about said pivot bearings continuously over 360 degrees,
        a gear drive assembly based on a Geneva gear mechanism to provide accurate and quick positioning of said rotatable tumbler housing, a first Galilean afocal optical assembly housed within said tumbler to axially rotate about said pivot bearings, a second Galilean afocal optical assembly housed radially orthogonal from said first Galilean afocal optical assembly within said tumbler to axially rotate about said pivot bearings, said first and second Galilean afocal optical assemblies forming an axially rotatable crossed Galilean afocal optical system, and a flat thermal reference surface housed at an intermediate 45 degree angle radial position between said first and second Galilean afocal optical assemblies, wherein when said tumbler is rotated to have said flat thermal reference surface normal to an optical axis of said imager optical assembly, said host system is enabled to perform an automatic calibration routine for rapid calibration of said host system's detector array, wherein various fields of view can be electro-mechanically selected for viewing, as well as said flat thermal reference surface for uniform temperature calibration.

2. The multiple field of view dual band optical device according to claim 1, wherein said Geneva gear mechanism provides four basic rotational step positions at 90 degree angles for the crossed Galilean afocal optical system, as well as an intermediate step at 45 degrees for the thermal reference surface.

3. The multiple field of view dual band optical device according to claim 1, wherein said flat thermal reference is capable of providing a uniform temperature radiation within an optical footprint of a beam of light directed to a detector.

4. The multiple field of view dual band optical device according to claim 1, wherein said flat thermal reference is based on a copper plate painted with a uniform black coating.

5. The multiple field of view dual band optical device according to claim 1, wherein said flat thermal reference is based on a thermo-electrically stabilized assembly capable of temperature adjustment.

6. The multiple field of view dual band optical device according to claim 1, wherein said gear drive assembly is based on a Geneva gear mechanism driven by a rotary electric motor which allows remote operation.

7. The multiple field of view dual band optical device according to claim 1, wherein said gear drive assembly is comprised of:
a Geneva gear mechanism;
a motor assembly; and
a controller circuit to power and control the motor assembly.

8. The multiple field of view dual band optical device according to claim 7, wherein said controller circuit accepts input power from a DC source and provides a serial USB computer interface for receiving commands and sending status information.

9. The multiple field of view dual band optical device according to claim 1, wherein said crossed Galilean afocal optical system is capable of providing four different magnification powers for four distinctly selectable fields of view, depending on rotation relative to an imaging camera.

10. The multiple field of view dual band optical device according to claim 9, wherein said first Galilean afocal optical assembly is characterized by a magnification power of either 1.3× or 0.77×, depending on rotation relative to an imaging camera, and wherein said second Galilean afocal optical assembly is characterized by a magnification power of either 2.86× or 0.35×, depending on rotation relative to said imaging camera.

11. The multiple field of view dual band optical device according to claim 1, wherein said first Galilean afocal optical assembly is comprised of:
a large lens element disposed at one end of a path of light rays;
a correcting lens to correct color and other aberrations interposed along an opposite end of said path of light rays; and
a small outer lens element disposed with said correcting lens at the opposite end of said path of light rays, wherein individual lens material for the respective lens is chosen such that simultaneous optical correction over both 3-5 and 8-12 micron spectral bands is obtained by configuring combinations of lens materials with different indices of refraction and partial dispersion based on crystalline materials chosen from a group consisting of Germanium, Zinc Sulphide, Zinc Selenide, Gallium Arsenide, as well as an amorphous glass material AMTIR-1.

12. The multiple field of view dual band optical device according to claim 1, wherein said first Galilean afocal optical assembly is comprised of:
a large lens made of AMTIR-1 and having a power of 0.00287 diopters disposed at one end of a path of light rays;
a ZnS lens with −0.000186 diopters to correct color and other aberrations interposed along an opposite end of said path of light rays; and
a GaAs lens 10 with −0.00351 diopters power disposed at an opposite end of said path of light rays.

13. The multiple field of view dual band optical device according to claim 1, wherein said second Galilean afocal optical assembly is comprised of:
a large lens disposed at one end of a path of light rays;
a large correcting lens disposed with said large lens along said path of light rays to correct color and other aberrations;
a small correcting lens to correct color and other aberrations interposed along an opposite end of said path of light rays; and
a small outer lens disposed with said small correcting lens at the opposite end of said path of light rays, wherein an individual lens material for the respective lens is chosen such that simultaneous optical correction over both 3-5 and 8-12 micron spectral bands is obtained by configuring combinations of lens materials with different indices of refraction and partial dispersion based on crystalline materials chosen from a group consisting of Germanium, Zinc Sulphide, Zinc Selenide, Gallium Arsenide, as well as an amorphous glass material AMTIR-1.

14. The multiple field of view dual band optical device according to claim 1, wherein said second Galilean afocal optical assembly is comprised of:
a large lens made of AMTIR-1 with power 0.0103 diopters disposed at one end of a path of light rays;
a large ZnS lens with −0.00295 diopters power disposed along said one end of a path of light rays to correct color and other aberrations;
a ZnSe lens with 0.007935 diopters to correct color and other aberrations interposed along an opposite end of said path of light rays; and a Germanium lens with −0.0319 diopters power disposed with said ZnSe lens at the opposite end of said path of light rays as a small outer lens.

15. A method for multiple field of view dual band optical imaging using a multiple field of view dual band optical device based on a rotating electro-mechanical tumbler which houses two orthogonal Galilean afocal optical assemblies and at least one uniform temperature calibration source, the method comprising the steps of:

arranging said multiple field of view dual band optical device in optical alignment with an imaging assembly of a host system; and aligning by rotation one optical end of an electro-mechanical tumbler of said multiple field of view dual band optical device to an optical axis of said imaging assembly, wherein:

when the electro-mechanical tumbler is moved to a 45 degree angle, a reference surface is positioned normal to the optical axis of the host system for use as a calibration source, when the electro-mechanical tumbler is rotated such that a first optical end of a first Galilean afocal optical assembly housed within said electro-mechanical tumbler is positioned normal to the optical axis of the host system such that light from a scene first enters the first optical end, then light from a scene passing through said first Galilean afocal optical assembly is reduced in diameter but magnified in angle to produce a positive magnification of the first Galilean afocal optical assembly, when the electro-mechanical tumbler is rotated such that an opposing optical end of said first Galilean afocal optical assembly housed within said electro-mechanical tumbler is positioned normal to the optical axis of the host system such that light from a scene first enters the opposing optical end, then light from a scene passing through said first Galilean afocal optical assembly is enlarged but its divergent angle is reduced to produce a negative magnification, which is the inverse power of the positive magnification of the first Galilean afocal optical assembly, when the electro-mechanical tumbler is rotated such that a first optical end of a second Galilean afocal optical assembly housed within said electro-mechanical tumbler is positioned normal to the optical axis of the host system such that light from a scene first enters the first optical end, then light from a scene passing through said second Galilean afocal optical assembly is reduced in diameter but magnified in angle to produce a positive magnification of the second Galilean afocal optical assembly, which is different from the positive magnification of the first Galilean afocal optical assembly, and when the electro-mechanical tumbler is rotated such that an opposing optical end of said second Galilean afocal optical assembly housed within said electro-mechanical tumbler is positioned normal to the optical axis of the host system such that light from a scene first enters the opposing optical end, then light from a scene passing through said second Galilean afocal optical assembly is enlarged but its divergent angle is reduced to produce a negative magnification, which is the inverse power of the positive magnification of the second Galilean afocal optical assembly, wherein various fields of view can be electro-mechanically selected for viewing, as well as said reference source for uniform temperature calibration.

16. The method for multiple field of view dual band optical imaging according to claim 15, wherein said multiple field of view dual band optical device is disposed between said imaging assembly and an external optical afocal magnifier lens assembly, which external optical afocal magnifier lens assembly provides further scaling of a system focal length, wherein the imaging assembly and external afocal magnifier lens assembly are both able to function in the 3-5 micron and 8-12 micron spectral bands simultaneously.

* * * * *